United States Patent

Han

(10) Patent No.: US 12,126,052 B2
(45) Date of Patent: Oct. 22, 2024

(54) ELECTRODE ASSEMBLY AND SECONDARY BATTERY HAVING THE SAME

(71) Applicant: Samsung SDI Co., Ltd., Yongin-si (KR)

(72) Inventor: Min Yeol Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/643,706

(22) Filed: Dec. 10, 2021

(65) Prior Publication Data

US 2022/0200109 A1    Jun. 23, 2022

(30) Foreign Application Priority Data

Dec. 17, 2020  (KR) .................. 10-2020-0177605

(51) Int. Cl.
*H01M 50/54*    (2021.01)
*H01M 50/30*    (2021.01)

(52) U.S. Cl.
CPC ........... *H01M 50/54* (2021.01); *H01M 50/30* (2021.01)

(58) Field of Classification Search
CPC .............................. H01M 50/54; H01M 50/30
See application file for complete search history.

(56) References Cited

U.S. PATENT DOCUMENTS

| | | | |
|---|---|---|---|
| 5,998,059 A | 12/1999 | Jeon | |
| 6,103,424 A | 8/2000 | Hamamatsu et al. | |
| 9,741,987 B2 | 8/2017 | Okuda et al. | |
| 9,893,345 B2 | 2/2018 | Kwak | |
| 9,991,499 B2 | 6/2018 | Saito et al. | |
| 10,115,946 B2 | 10/2018 | Guen | |
| 2009/0136834 A1* | 5/2009 | Coowar | H01M 10/0583 29/623.2 |
| 2012/0156536 A1* | 6/2012 | Yamazaki | H01M 50/55 429/96 |
| 2015/0295222 A1 | 10/2015 | Kwak | |
| 2015/0325832 A1 | 11/2015 | Saito et al. | |
| 2016/0064714 A1 | 3/2016 | Okuda et al. | |
| 2016/0322626 A1* | 11/2016 | Okuda | H01M 50/466 |

(Continued)

FOREIGN PATENT DOCUMENTS

| | | |
|---|---|---|
| CN | 106981596 A | 7/2017 |
| JP | 2012-151034 A | 8/2012 |

(Continued)

OTHER PUBLICATIONS

Extended European Search Report, issued in corresponding application No. EP 21215289.6, dated May 16, 2022, 8 pages.

(Continued)

*Primary Examiner* — Brian R Ohara
*Assistant Examiner* — Emily Elizabeth Freeman
(74) *Attorney, Agent, or Firm* — Lewis Roca Rothgerber Christie LLP

(57) ABSTRACT

A secondary battery including: an electrode assembly including a first electrode plate having a first electrode tab, a second electrode plate having a second electrode tab, and a separator between the first electrode plate and the second electrode plate; and a case accommodating the electrode assembly. The separator includes an extension part extending in a direction in which gas is discharged to the outside of the case.

9 Claims, 4 Drawing Sheets

(56) References Cited

U.S. PATENT DOCUMENTS

2017/0098808 A1    4/2017  Guen
2019/0252726 A1    8/2019  Eom et al.
2020/0381687 A1*  12/2020  Yamashita .......... H01M 50/572

FOREIGN PATENT DOCUMENTS

| JP | 6199908 B | 9/2017 |
| KR | 10-0310875 B1 | 8/2002 |
| KR | 10 2004 0042373 A | 5/2004 |
| KR | 10-0496302 B1 | 6/2005 |
| KR | 10-2015-0117937 A | 10/2015 |

OTHER PUBLICATIONS

Chinese Notification of the First Office Action, for Patent Application No. 202111555046.6, mailed Nov. 2, 2023, with English Translation, 13 pages.

\* cited by examiner

ELECTRODE ASSEMBLY AND SECONDARY BATTERY HAVING THE SAME

CROSS-REFERENCE TO RELATED APPLICATION

This application claims priority to and the benefit of Korean Patent Application No. 10-2020-0177605, filed on Dec. 17, 2020, in the Korean Intellectual Property Office, the content of is incorporated herein by reference in its entirety.

BACKGROUND

1. Field

Aspects of embodiments of the present disclosure relate to an electrode assembly and a secondary battery having the electrode assembly.

2. Description of the Related Art

A secondary battery includes an electrode assembly having a positive electrode plate, a negative electrode plate, and a separator sequentially wound or stacked that is accommodated inside a case with an electrolyte solution or a solid electrolyte.

Secondary batteries may be classified as a circular (or cylindrical) battery, a prismatic battery, a pouch battery, and the like, depending on the shape of a case. As one example, the prismatic battery is configured such that a wound or stacked electrode assembly is accommodated inside a hexahedral case and a cap assembly presses positive and negative electrode substrates protruding to one side to then be assembled. Therefore, the size of a separator is limited in a direction in which the positive and negative electrode substrates protrude.

However, when a prismatic battery is exposed to heat, a phenomenon in which internal heat is collected toward (or near) a cap assembly may occur, which may cause damage to a separator disposed at the upper side. In such a case, the separator may shrink or be melted to cause a short circuit.

The above information disclosed in this Background section is only for enhancement of understanding of the background of the present disclosure, and therefore, it may contain information that does not constitute prior art.

SUMMARY

Embodiments of the present disclosure provide an electrode assembly having an internal short-circuit prevention structure and a secondary battery having the electrode assembly.

These and other aspects and features of the present disclosure will be described in, or will be apparent from, the following description of embodiments of the present disclosure.

A secondary battery according to an embodiment of the present disclosure includes: an electrode assembly including a first electrode plate having a first electrode tab, a second electrode plate having a second electrode tab, and a separator between the first electrode plate and the second electrode plate; and a case accommodating the electrode assembly. The separator includes an extension part extending in a direction in which gas is discharged to the outside of the case.

The secondary battery may also include a cap assembly coupled to an opening in the case. A height of the extension part may be less than a gap between the cap assembly and the electrode assembly.

An end of the extension part facing the cap assembly may be closer to the cap assembly than to the electrode assembly.

The cap assembly may include a safety vent, and the extension part may be adjacent to the safety vent.

A width of the extension part may be smaller than that of the electrode assembly.

A width of the extension part may be smaller than that of the electrode assembly and greater than that of the first electrode tab or the second electrode tab.

A width of the extension part may be smaller than a distance between the first electrode tab and the second electrode tab.

An edge of the extension part may have a round shape.

DETAILED DESCRIPTION

Figure 1:
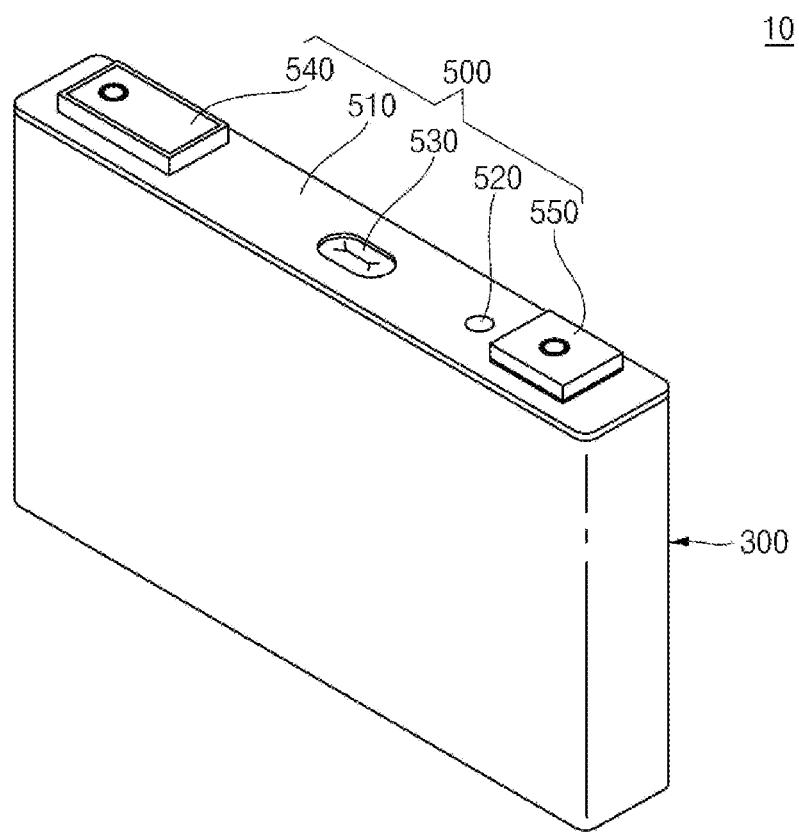
FIG. 1 is a perspective view showing a secondary battery according to an embodiment of the present disclosure.

Hereinafter, embodiments of the present disclosure will be described in detail. The subject matter of the present disclosure, however, may be embodied in many different forms and should not be construed as being limited to the embodiments set forth herein. Rather, these embodiments are provided so that this disclosure will be thorough and complete and will convey the aspects and features of the present disclosure to those skilled in the art.

In the accompanying drawings, sizes or thicknesses of various components may be exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise," "include," or "have," and variations thereof, such as "comprising," "including," or "having," when used in this specification, specify the presence of stated features, numbers, steps, operations, elements, and/or components but do not preclude the presence or addition of one or more other features, numbers, steps, operations, elements, components, and/or groups thereof. As used herein, the singular forms "a" and "an" are intended to include the plural forms as well, unless the context clearly indicates otherwise.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Hereinafter, a secondary battery according to an embodiment of the present disclosure will be described in detail with reference to the accompanying drawings.

Figure 2:
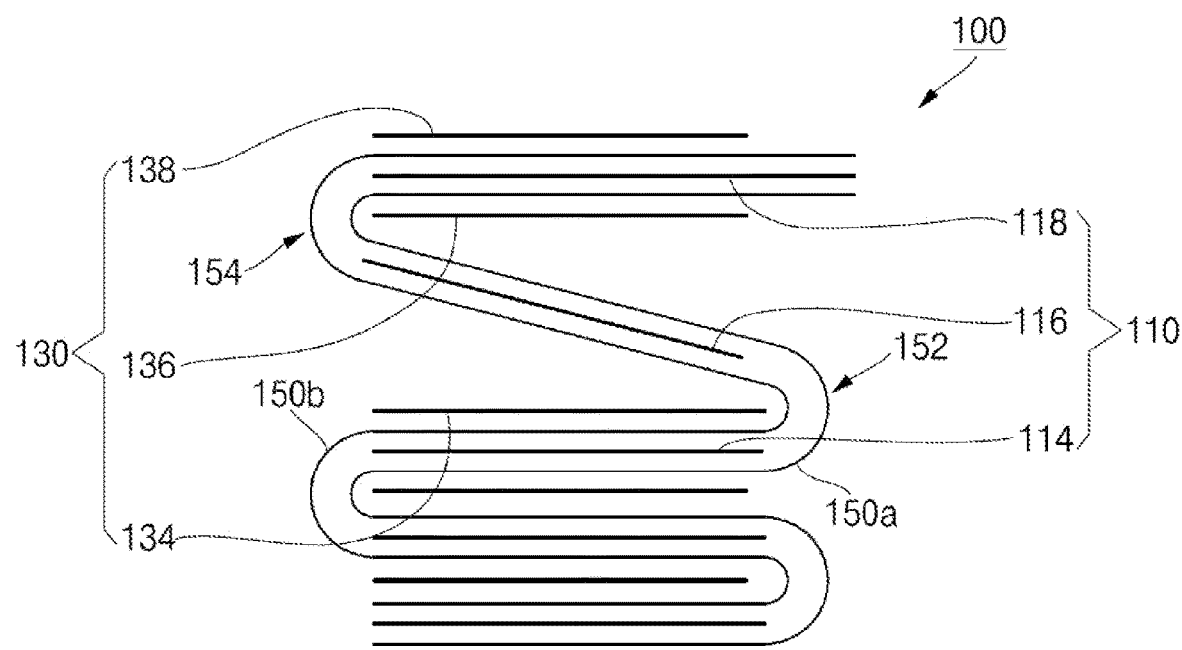
FIG. 2 is a side view showing the shape of an electrode assembly in the secondary battery shown in FIG. 1.
Figure 3:
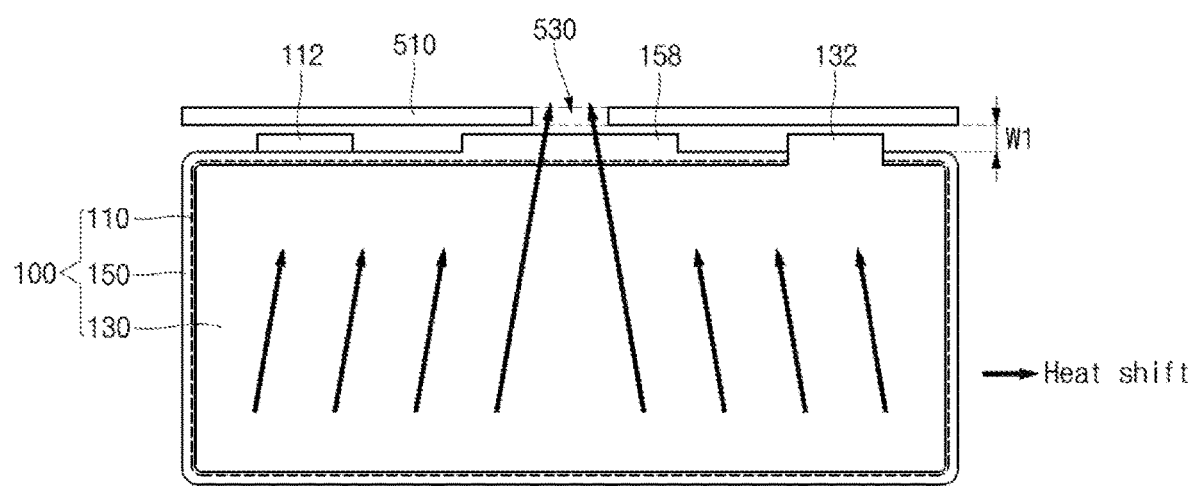
FIG. 3 is a schematic diagram showing an assembled state of a cap assembly in the secondary battery shown in FIG. 1.

FIG. 1 is a perspective view showing a secondary battery according to an embodiment of the present disclosure, FIG. 2 is a side view showing the shape of an electrode assembly in the secondary battery shown in FIG. 1, and FIG. 3 is a schematic diagram showing an assembled state of a cap assembly in the secondary battery shown in FIG. 1.

As shown in FIGS. 1 and 2, the secondary battery 10 according to an embodiment of the present disclosure may include a case 300, an electrode assembly 100 accommodated in the case 300, and a cap assembly 500 sealing the case 300.

The case 300 may have a substantially rectangular parallelepiped shape, and an upper side surface thereof (e.g., a narrow upper side as shown in FIG. 1) in the long side direction may be open. Although the opened portion (e.g., the opening) is not shown in the drawing, the peripheral portion of the case 300 to which the cap assembly 500 shown in FIG. 1 is coupled may correspond to a substantially open portion. After the electrode assembly 100 and the electrolyte are accommodated through (e.g., inserted through) the opened portion, the cap assembly 500 is coupled to seal the case 300. The case 300 may include (or may be made of) a conductive metal, such as aluminum, an aluminum alloy, or nickel-plated steel. A secondary battery in which the case 300 has a substantially hexahedral shape may also be referred to as a prismatic battery.

As shown in FIGS. 2 and 3, the electrode assembly 100 may include a first electrode plate 110, a second electrode plate 130, and separators 150a and 150b (collectively referred to as separator 150).

The first electrode plate 110 may be a positive electrode or a negative electrode. When the first electrode plate 110 is a positive electrode, a positive electrode active material layer may be formed on both surfaces of the first electrode plate 110, and a negative electrode active material layer may be formed on both sides of the second electrode plate 130. When the first electrode plate 110 is a positive electrode, the second electrode plate 130 may be a negative electrode, and when the first electrode plate 110 is a negative electrode, the second electrode plate 130 may be a positive electrode. An embodiment in which the first electrode plate 110 is a negative electrode will be described as an example herein.

The first electrode plate 110 may be formed by applying or coating an active material, such as graphite or carbon, on a substrate including (or made of) a metal foil, such as copper, a copper alloy, nickel, or a nickel alloy. Hereinafter, the active material layer will be referred to as a coating portion. A non-coating portion to which an active material is not applied may be formed on the first electrode plate 110. The first electrode plate 110 may include a first electrode tab 112, that is, a negative electrode tab, extending a length (e.g., a predetermined length) in one direction from the non-coating portion (see, e.g., FIG. 3).

The second electrode plate 130 may be formed by applying or coating an active material, such as a transition metal oxide, on a substrate including (or made of) a metal foil, such as aluminum or an aluminum alloy. A non-coating portion to which an active material is not applied may be formed on the second electrode plate 130. The second electrode plate 130 may include a second electrode tab 132, that is, a positive electrode tab, extending a length (e.g., a predetermined length) in one direction from the non-coating portion (see, e.g., FIG. 3).

The separator 150 is interposed between the first electrode plate 110 and the second electrode plate 130 to prevent short circuits therebetween and to enable movement of lithium ions. The separator 150 may include (or may be made of) polyethylene, polypropylene, or a composite film of polyethylene and polypropylene, but it is not limited thereto.

With reference to FIG. 2, the electrode assembly 100 may be configured such that the first electrode plate 110, the second electrode plate 130, and the separator 150 are repeatedly stacked in a 'Z' shape, but the stacking type or arrangement is not limited thereto. The electrode assembly 100 is configured such that any one of the first electrode plate 110 and the second electrode plate 130 may be stacked in a 'Z' shape, and the other of the first electrode plate 110 and the second electrode plate 130 may be disposed between bent or folded portions. Hereinafter, descriptions will be made on the basis of an embodiment in which the first electrode plate 110 is bent in a 'Z' shape. The structure of the electrode assembly 100 will now be described in more detail below.

As shown in FIG. 2, the first electrode plate 110 may include a first electrode plate-first coating portion 114, a first electrode plate-second coating portion 116, a first electrode plate-third coating portion 118, and a first electrode plate-N-th coating portion (wherein N indicates an N-th coating portion). The first electrode plate-first coating portion 114 and the first electrode plate-second coating portion 116 are arranged on the same plane before the first electrode plate 110 is bent and stacked. However, when the first electrode plate 110 is alternately bent in one direction and the other direction and then stacked in a 'Z' shape, the first electrode plate-first coating portion 114 and the first electrode plate-second coating portion 116 are arranged to be vertically spaced apart from each other in the stacking direction. In a state in which the stacking is completed, the first electrode plate-first coating portion 114 may be parallel to the first electrode plate-second coating portion 116. Similarly, the first electrode plate-third coating portion 118 is arranged to be vertically spaced apart from the first electrode plate-second coating portion 116, and in a state in which the stacking is completed, the first electrode plate-third coating portion 118 may be parallel to the first electrode plate-second coating portion 116. In the same manner, stacking may be performed such that all coating portions up to the N-th coating portion become parallel to one another. The bending of the first electrode plate 110 may be performed on a non-coating portion where the coating portion is not formed. When the first electrode plate 110 has N coating portions and the N coating portions are stacked, to prevent the N coating portions from contacting each other and being short-circuited, the separators 150a and 150b may be provided.

When viewed in a planar state before the first electrode plate 110 is bent, two separators 150a and 150b may be provided so as to cover the front and rear surfaces of the first electrode plate 110, respectively. When the first electrode plate 110 is bent and stacked in a Z' shape, as shown in FIG. 2, the separators 150a and 150b are configured to surround (e.g., sandwich) the first electrode plate 110 from the top and bottom sides. The structure resulting after the separators 150a and 150b surround the first electrode plate 110 and are then stacked may have a meandering shape, as shown in FIG. 2. Portions formed by bending the first electrode plate 110 and the separators 150 may be defined as bending regions.

After the separators 150a and 150b surround the first electrode plate 110 and are then stacked, a first bending region 152 between the first electrode plate-first coating portion 114 and the first electrode plate-second coating portion 116 may be formed in a direction opposite to a second bending region 154 between the first electrode plate-second coating portion 116 and the first electrode plate-third coating portion 118. For example, the first bending region 152 may be formed by bending the first electrode plate 110 in one direction (e.g., in the left direction of FIG. 2), and the second bending region 154 may be formed by bending the first electrode plate 110 in the other direction (e.g., in the right direction of FIG. 2). In the same manner, bending regions may be sequentially formed up to an N-th bending region. In the thus-bent first electrode plate 110, coating portions 134, 136, and 138 of the second electrode plate 130 may be interposed between portions of the bent first electrode plate 110.

The second electrode plate 130 may include a second electrode plate-first coating portion 134, a second electrode plate-second coating portion 136, a second electrode plate-third coating portion 138, and a second electrode plate-N-th coating portion. Here, the second electrode plate-first coating portion 134 is interposed between the first electrode plate-first coating portion 114 and the first electrode plate-second coating portion 116. Of course, the separators 150a and 150b are interposed respectively between the second electrode plate-first coating portion 134 and the first electrode plate-first coating portion 114 and between the second electrode plate-first coating portion 134 and the first electrode plate-second coating portion 116. Therefore, the second electrode plate-first coating portion 134 may be stacked to face the first electrode plate-first coating portion 114 and the first electrode plate-second coating portion 116 with the separators 150a and 150b interposed therebetween. In the same manner, the second electrode plate-second coating portion 136 and the second electrode plate-third coating portion 138 are all arranged up to the N-th coating portion, thereby forming the electrode assembly 100.

The above-described first and second electrode plates 110 and 130 may include the first electrode tab 112 and the second electrode tab 132, respectively, to be electrically connected to the outside. The first electrode tab 112 and the second electrode tab 132 may be disposed to face one side when the electrode assembly 100 is stacked. The electrode assembly 100 is accommodated in the case 300 in a state in which the first electrode tab 112 and the second electrode tab 132 are disposed in a direction toward the cap assembly 500.

As shown in FIG. 1, the cap assembly 500 is coupled to the case 300 in a state in which the electrode assembly 100 is accommodated in the case 300. The cap assembly 500 may include a cap plate 510, which seals the opening in the case 300, a plug 520, which seals an electrolyte injection opening (e.g., an electrolyte injection hole), a safety vent 530 which is configured to burst when internal gas pressure exceeds a reference (e.g., predetermined) level to become a gas discharge passage to discharge the internal gas, and a first terminal 540 and a second terminal 550, which are respectively electrically connected to the first electrode tab 112 and the second electrode tab 132. The cap plate 510 may include (or may be made of) the same material as the case 300 and may be coupled to the case 300 by, for example, laser welding.

In the secondary battery 10 having the above-described structure, heat may be generated inside the secondary battery 10 due to, for example, a high-temperature operating environment or overcharging. Heat distribution and movement inside the secondary battery 10 will now be described. As shown in FIG. 3, heat moves and gathers in a portion where the safety vent 530 of the cap assembly 500 is located. Because the portion where the safety vent 530 is located is thinner than other portions of the cap assembly 500, heat rises and gathers, and the high-temperature heat is condensed and discharged toward the safety vent 530. When heat gathers toward one side, a structure that is weak to heat may be inevitably affected.

When the effect of heat is evaluated by creating a high-temperature environment after cover tapes of different materials are attached to the exterior side of the case 300 of the secondary battery 10, shrinkage of the cover tapes commonly appears on the upper end in the direction of the cap assembly 500 of the secondary battery 10. Accordingly, to reduce or minimize and solve the above-described effects and problems due to heat, the separator 150 having an improved structure is proposed in the present disclosure.

Figure 4:
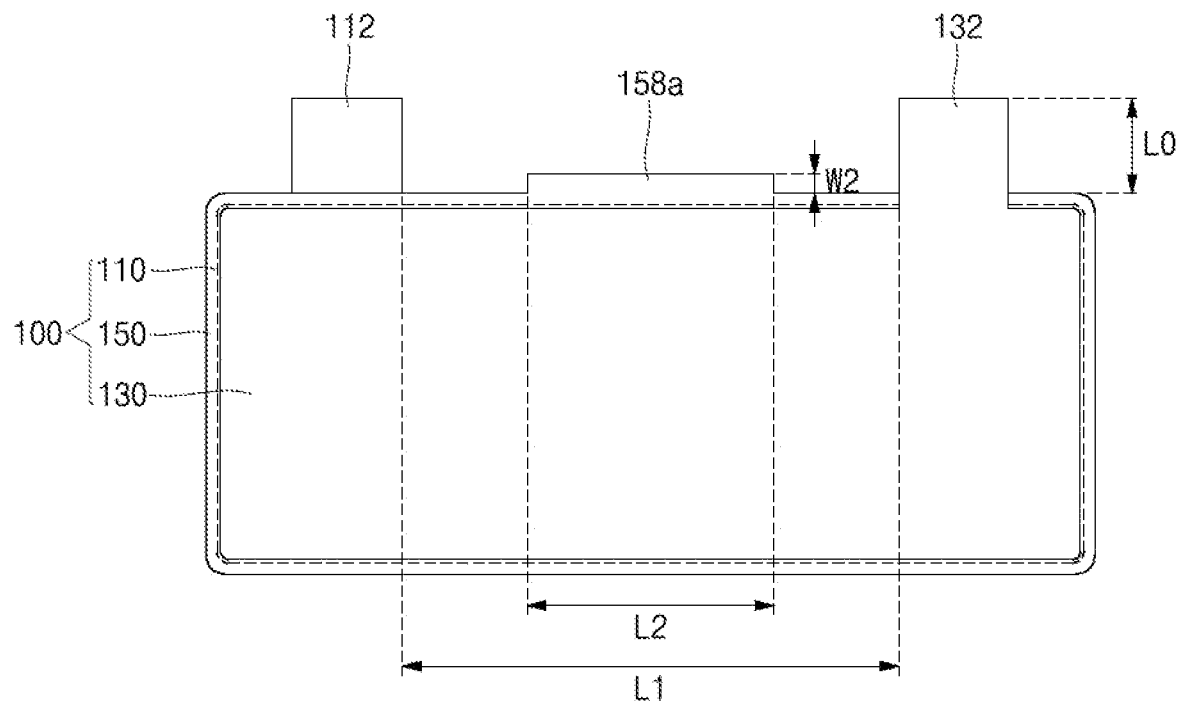
FIG. 4 is a schematic diagram showing an electrode assembly to which a separator according to an embodiment of the present disclosure is applied.
Figure 5:
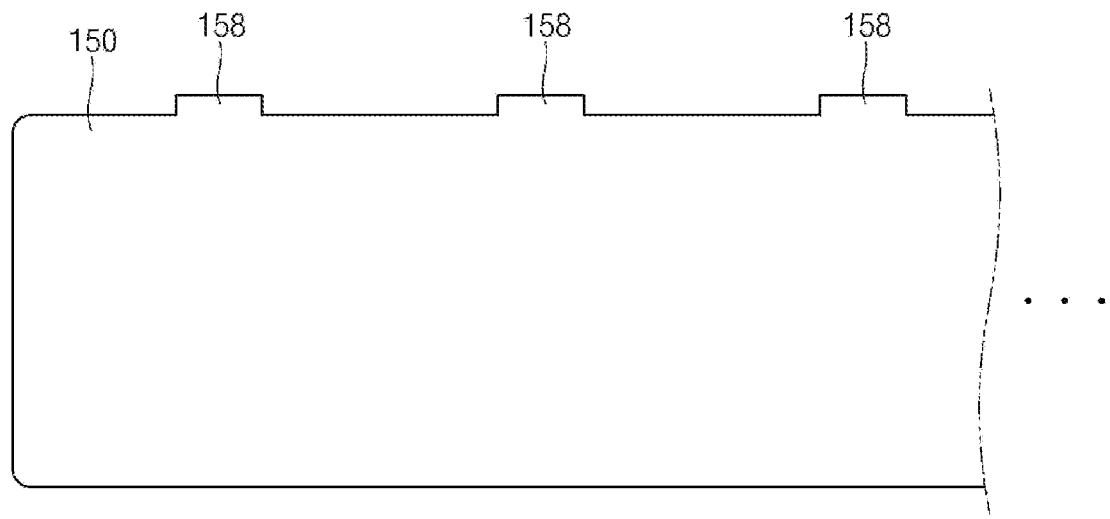
FIG. 5 is a plan view showing the separator shown in FIG. 4 in an unfolded state.
Figure 6:
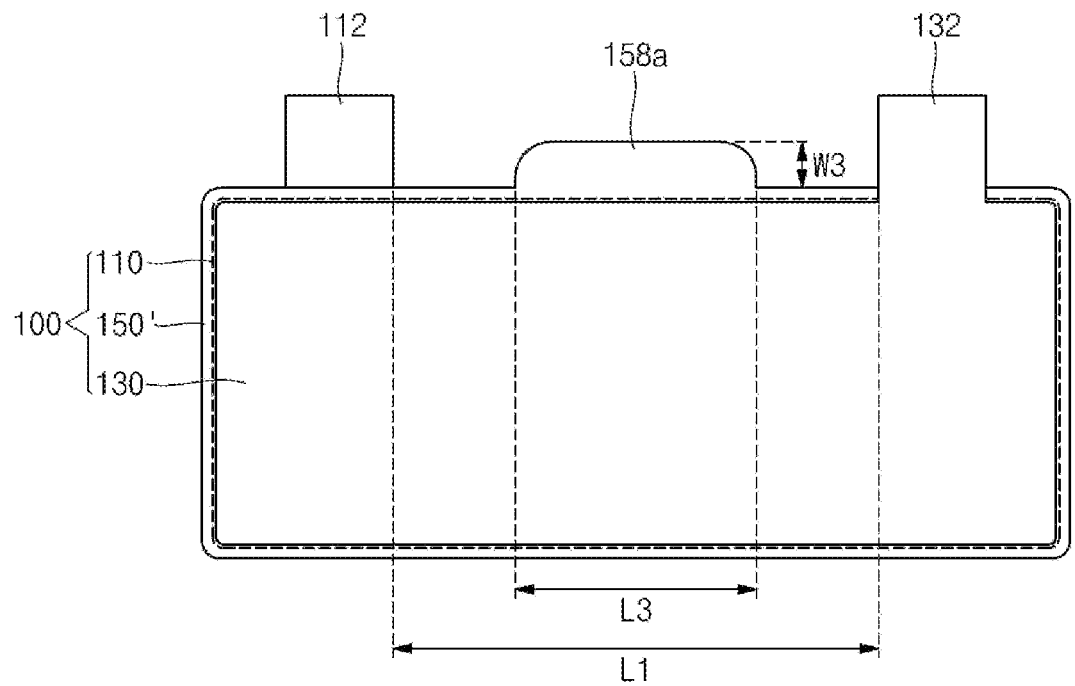
FIG. 6 is a schematic diagram showing an electrode assembly to which a separator according to an embodiment of the present disclosure is applied.
Figure 7:
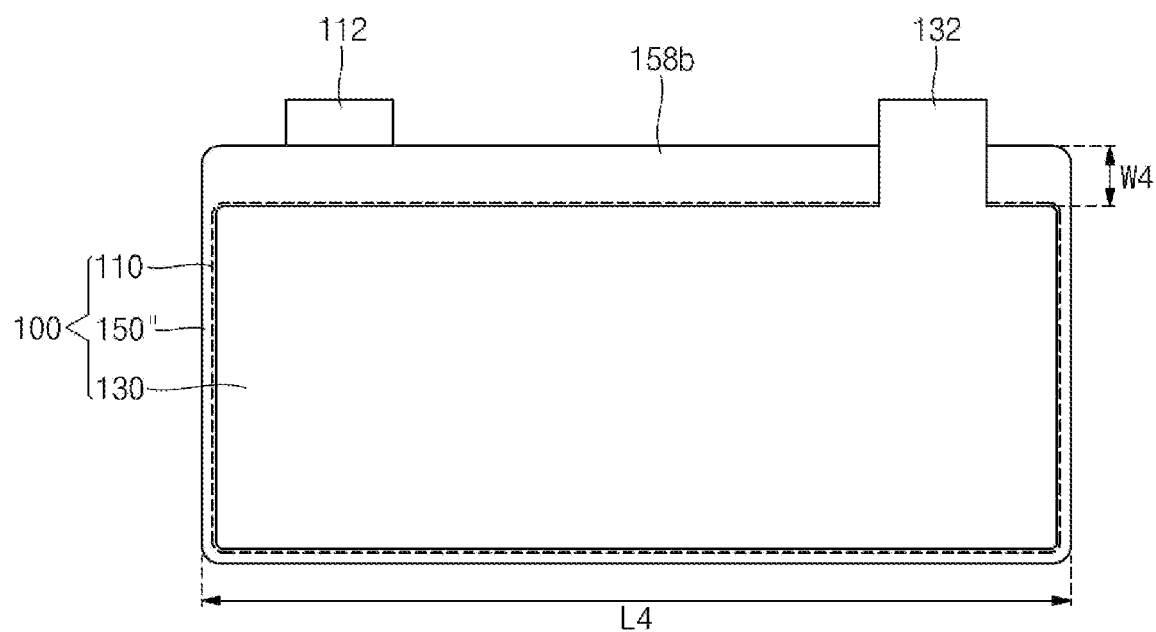
FIG. 7 is a schematic diagram showing an electrode assembly to which a separator according to an embodiment of the present disclosure is applied.

FIG. 4 is a schematic diagram showing an electrode assembly to which a separator according to an embodiment of the present disclosure is applied, and FIG. 5 is a plan view showing the separator shown in FIG. 4 in an unfolded state. FIG. 6 is a schematic diagram showing an electrode assembly to which a separator according to another embodiment of the present disclosure is applied. FIG. 7 is a schematic diagram showing an electrode assembly to which a separator according to another embodiment of the present disclosure is applied.

When assembling the cap assembly 500, as shown in FIG. 3, the cap assembly 500 is assembled in a state in which the first electrode tab 112 and the second electrode tab 132 are pressed against the cap plate 510. Therefore, the shape of the separator 150 may be determined in consideration of the distance between the cap plate 510 and the electrode assembly 100 after the cap assembly 500 is assembled. The separator 150 shown in FIG. 4 has a structure taking this into consideration.

As shown in FIGS. 4 and 5, the separator 150 according to an embodiment of the present disclosure may have a rectangular shape. In addition, the separator 150 may include an extension part 158 extending outwardly at a interval (e.g., a predetermined interval) on one side of the separator 150 in the longitudinal direction. The extension part 158 may extend in a rectangular shape. The length L2 of the extension part 158 may be smaller than the distance L1 between the first electrode tab 112 and the second electrode tab 132 in a state in which winding is completed. In addition, the width W2 of the extension part 158 may be smaller than the distance W1 (see, e.g., FIG. 3) between the cap plate 510 and the electrode assembly 100 after the cap assembly 500 is assembled. Thus, the width W2 is shorter than the length L0 in which the electrode tab the protrudes, and the end of the extension part 158 located at a side of the cap assembly 500 is formed closer to the cap plate 510 than the electrode assembly 100. When the separator 150 is coupled to the first electrode plate 110, the separator 150 is disposed such that the extension part 158 faces the first electrode tab 112.

Also, as shown in FIG. 6, the separator 150' according to another embodiment of the present disclosure may include an extension part 158a having a larger area than that of the separator 150 shown in FIG. 4. The extension part 158a of the separator 150' may be formed in a round shape, such as a streamlined shape or a semicircular shape, rather than an angled shape with a protruding corner in a rectangular shape as in the separator 150. Both the length L3 and the width W3 of the extension part 158a of the separator 150' may be greater than those of the extension part 158 of the separator 150. However, the length L3 of the extension part 158a of the separator 150' is shorter than the distance L1 between the first electrode tab 112 and the second electrode tab 132, and the width W3 is not greater than the distance W1 (see, e.g., FIG. 3) between the cap plate 510 and the electrode assembly 100 after assembling the cap assembly 500. However, in some embodiments, the width W3 may be equal to or greater than the distance W1 between the cap plate 510 and the electrode assembly 100, and accordingly, the extension part 158a may contact the cap plate 510.

Also, as shown in FIG. 7, the separator 150" according to another embodiment of the present disclosure may include an extension part 158b having a larger area than the distance L1 between the first electrode tab 112 and the second electrode tab 132. In this embodiment, the length L4 of the extension part 158b may cover (e.g., may overlap) some or all of the first electrode tab 112 and the second electrode tab 132 along the length direction of the electrode assembly 100. The width W4 of the extension part 158b may be the same as that of the extension part 158 of the separator 150 or of the extension part 158a of the separator 150'. When the length L4 of the extension part 158b is the same as the length from one end to the other end in the longitudinal direction of the electrode assembly 100 (see, e.g., FIG. 7), the extension part 158b may have the same shape as when the size of the separator 150 is increased by the size of the extension part 158b.

The separators 150, 150', and 150" having the extension parts 158, 158a, and 158b according to the above-described embodiments are configured to respond to separator shrinkage or deformation, such as melting, at a portion where heat rises and gathers, as shown in FIG. 3. By increasing the area of the separator 150, 150', 150" in the portion where the heat rises and gathers, a sufficient area may remain even if the separator 150, 150', 150" shrinks or is partially melt to prevent electrode plates from being exposed. Therefore, a short circuit caused by the exposure of and contact between electrode plates may be prevented and the operational safety of the secondary battery may be improved.

According to embodiments of the present disclosure, damage to the separator caused by heat rising and gathering toward a vent of a cap assembly in a high-temperature environment can be reduced or minimized. In addition, an internal short circuit of a secondary battery may be prevented by reducing or minimizing the damage to the separator.

What has been described above are some embodiments for carrying out the present disclosure. It will be understood by those of ordinary skill in the art that the embodiments described herein should be considered in a descriptive sense and not for purposes of limitation and various changes in form and details may be made therein without departing from the spirit and scope of the present disclosure as defined by the following claims and their equivalents.

What is claimed is:
1. A secondary battery comprising:
a case;
a cap assembly coupled to an opening in the case, the cap assembly comprising a safety vent; and
an electrode assembly accommodated in the case, the electrode assembly comprising:
 a first electrode plate having a first electrode tab;
 a second electrode plate having a second electrode tab; and
 a separator between the first electrode plate and the second electrode plate in a stacking direction and having an integral extension part that extends from between the first electrode plate and the second electrode plate to beyond an upper edge of the first electrode plate and an upper edge of the second electrode plate in a direction in which gas is discharged to the outside of the case,
wherein the extension part of the separator is between the first electrode tab and the second electrode tab in the stacking direction,
wherein a length of the extension part is smaller than a distance between the first electrode tab and the second electrode tab such that a gap is between the extension part and the first electrode tab and between the extension part and the second electrode tab, and
wherein the first electrode plate and the second electrode plate are exposed through the extension part of the separator at an area aligned with the safety vent.
2. The secondary battery of claim 1,
wherein a width of the extension part is less than a gap between the cap assembly and the upper edge of the first electrode plate and the upper edge of the second electrode plate.
3. The secondary battery of claim 2, wherein a distal end of the extension part facing the cap assembly is closer to the cap assembly than to the upper edge of the first electrode plate and the upper edge of the second electrode plate.

4. The secondary battery of claim 1, wherein a length of the extension part is smaller than that of the electrode assembly.

5. The secondary battery of claim 1, wherein a length of the extension part is smaller than that of the electrode assembly and greater than that of the first electrode tab or the second electrode tab.

6. The secondary battery of claim 1, wherein an edge of the extension part has a round shape.

7. The secondary battery of claim 1, wherein the first electrode tab extends from the upper edge of the first electrode plate, and
wherein a width of the extension part from an upper edge of the separator from where the extension part extends to a distal end of the extension part is smaller than a width of the first electrode tab from the upper edge of the first electrode plate to a distal end of the first electrode tab.

8. The secondary battery of claim 7, wherein the second electrode tab extends from the upper edge of the second electrode plate, and
wherein the width of the extension part is smaller than a width of the second electrode tab from the upper edge of the second electrode plate to a distal end of the second electrode tab.

9. The secondary battery of claim 1, wherein a first width of the separator from a bottom edge thereto to an upper edge thereof at an area between the first electrode tab and the extension part is smaller than a second width of the separator from the bottom edge thereto to an upper edge of the extension part.

* * * * *